United States Patent [19]

Kitada et al.

[11] Patent Number: 4,841,399
[45] Date of Patent: Jun. 20, 1989

[54] MAGNETORESISTIVE MAGNETIC HEAD INCLUDING ZIRCONIUM SHUNT FILM

[75] Inventors: Masahiro Kitada, Tokyo; Noboru Shimizu, Tokorozawa; Hideo Tanabe; Hitoshi Nakamura, both of Tokyo; Tetsuo Kobayashi, Kanagawa; Tooru Takeura, Odawara; Kazuhiro Momata, Chigasaki, all of Japan

[73] Assignee: Hitachi, Ltd., Tokyo, Japan

[21] Appl. No.: 936,617

[22] Filed: Dec. 1, 1986

[30] Foreign Application Priority Data

Nov. 29, 1985 [JP] Japan .................................. 60-267111

[51] Int. Cl.⁴ ............................................... G11B 5/30
[52] U.S. Cl. .................................... 360/113; 360/122; 360/125
[58] Field of Search ........................ 360/113, 121–123, 360/125–127

[56] References Cited

U.S. PATENT DOCUMENTS

| 3,940,797 | 2/1976 | Brock et al. | 360/113 |
| 4,489,357 | 12/1984 | Van Ooijen et al. | 360/113 |
| 4,663,684 | 5/1987 | Kamo et al. | 360/113 |

FOREIGN PATENT DOCUMENTS

| 59-135622 | 8/1984 | Japan | 360/113 |
| 61-170917 | 8/1986 | Japan | 360/113 |

Primary Examiner—John H. Wolff
Attorney, Agent, or Firm—Antonelli, Terry & Wands

[57] ABSTRACT

The use of a pure zirconium film as a shunt film in a magnetoresistive head having a permalloy film as a magnetoresistive film and a shunt film for application of a transverse biasing magnetic field serves to improve the heat resistance of the magnetoresistive element and allows an increase in the temperature used in the process for producing a magnetic head.

10 Claims, 1 Drawing Sheet

MAGNETORESISTIVE MAGNETIC HEAD INCLUDING ZIRCONIUM SHUNT FILM

BACKGROUND OF THE INVENTION

This invention relates to a magnetic head using a shunt biasing magnetoresistive element having a shunt film for application of a transverse biasing magnetic field. More particularly, the present invention is concerned with a magnetoresistive magnetic head which is particularly suitable for readout of a high-density magnetic recording.

As disclosed in, e.g., U.S. Pat. No. 3,940,797 and U.S. patent application Ser. No. 694,764, Ti, Ta, Mo, Au, Nb, etc. have been used for the shunt film of conventional shunt biasing magnetoresistive heads.

The shunt biasing magnetoresistive head having a shunt film made of Ti among the above-mentioned prior art has a drawback that a magnetoresistive film formed on a substrate and Ti react with each other at a temperature of 175° C. or higher, causing the deterioration of the characteristics of the permalloy film. The production of a shunt biasing magnetoresistive head requires various processes. Such processes include a conductor film forming process, an insulating film forming process and a shielding film forming process, all of which are preferably conducted at a temperature of 175° C. or higher. However, the processes requiring a treatment at a temperature of 175° C. or higher could not be used because of the necessity of suppressing the deterioration of characteristics of the head. On the other hand, although the temperature at whcih a known shunt film made of tantalum begins to react with the permalloy it is unsuitable as a shunt film because of its poor corrosion resistance and extremely high electrical resistivity, i.e., 90 to 200 $\mu\Omega cm$. It is preferable that the electrical resistivity of a shunt film be in the range of about 55 to 95 $\mu\Omega cm$ when the magnetoresistive film is made of a permalloy. The above-mentioned permalloy is a well-known Ni-Fe alloy containing 7 to 27 wt % of iron and commonly used as a magnetoresistive film. A conventionally known molybdenum film also does not react with a permalloy film until the temperature reaches 400° C. or higher but is extremely poor in corrosion resistance. A gold film has the same problem as the above-mentioned titanium film and reacts with a permalloy film at a temperature as low as 150° C. Further, a niobium film is unsuitable as a shunt film because it is not only poor in corrosion resistance as in the above-mentioned tantalum film, but also exhibits an extremely high electrical resistivity, i.e., 90 to 200 $\mu\Omega cm$.

As is a apparent from the foregoing, the conventionally known shunt films were not satisfactory.

U.S. Pat. No. 3,864,751 is also cited to show the state of the art.

SUMMARY OF THE INVENTION

Accordingly, an object of the present invention is to provide a magnetoresistive head having a highly heat-resistant shunt film suitable for use as a shunt magnetoresistive head.

To attain the above object, the magnetoresistive magnetic head of the present invention comprises a two-layer film structure of a Ni-Fe alloy (so-called permalloy) film containing 7 to 27 wt % of iron with the balance consisting essentially of nickel, and a pure zirconium film containing only unavoidable impurities. The permalloy film serves as a magnetoresistive film while the pure zirconium film serves as a shunt film for application of a transverse biasing magnetic field. The magnetic head of the present invention additionally has an electrode for applying a current to a magnetoresistive element and detecting changes in resistance of the magnetoresistive film. The substrates for forming these films include non-magnetic materials such as glass and ceramics and soft magnetic materials such as ferrites having a high magnetic permeability. Further, to concentrate the magnetic flux from a magnetic recording medium as well as to protect the magnetoresistive element, a block or thick film made of a soft magnetic material may be provided on one side or both sides of the above magnetoresistive element. The block of the soft magnetic material may also serve as a substance on which a magnetoresistive element is to be provided. When the soft magnetic material exhibits a low resistance, it is preferred that the soft magnetic material be provided on the magnetoresistive element through the medium of an insulating film. Further, when the soft magnetic material is provided on both sides of the magnetoresistive element, it is also expected that a shielding effect can be attained.

As is well known, the thickness of the magnetoresistive film comprising a permalloy is preferably 50 to 1000 Å, more preferably 300 to 500 Å. When the thickness is less than 50 Å, the magnetoresistive film is in a discontinuous state, which unfavorably leads to an extremely small degree of change in magnetic resistance as well as an extremely high electrical resistivity. On the other hand, in the case of a thickness exceeding 1000 Å, the shape effect of the element prepared from such a film increases, leading to a remarkable decrease in effective permeability of the element. In this case, in order to assure a sufficient output, it is necessary to increase the element current. However, the increase in element current unfavorably causes great heat generation, leading to an increase in noise.

The thickness of a shunt comprising the abovementioned pure zirconium is preferably 2.5 to 5 times that of the permalloy film. It is preferable that the electrical resistance of the shunt film be substantially the same as that of the magnetoresistive film. However, since the electrical resistivity of the pure zirconium film serving as a shunt film is 60 to 90 $\mu\Omega cm$ while the electrical resistivity of the permalloy film serving as a magnetoresistive film is 18 to 24 $\mu\Omega cm$, the thickness range of the pure zirconium film is 2.5 to 5 times that of the permalloy film, provided that the shapes of both films are the same. Therefore, when the thickness of the permalloy film is in the range of 50 to 1000 Å and 300 to 500 Å, the thickness of the pure zirconium film is in the range of 125 to 5000 Å and 750 to 2500 Å, respectively.

The present invention has been made based on a finding that the above-mentioned object of the present invention can be attained by using a shunt film constituting material comprising a metal film which reacts with a permalloy film only at high temperature and exhibits an electrical resistance suitable for the shunt structure. The metal film suitable for combination with the permalloy film should be determined through evaluation of elements actually prepared using various thin metal films. From the viewpoint of reaction with the permalloy film, a metal having a high melting point is preferable because the reaction depends on the thermal activation of the atom. At the same time, the metal should exhibit excellent corrosion resistance. The pure zirconium film used as the shunt film in the present invention not only has an electrical resistivity of 60 to 90 μΩcm and a melting point of 1857° C. but also has excellent corrosion resistance. It has been experimentally found that the temperature at which the reaction between a permalloy film and a pure zirconium film takes place is by about 100° C. higher than that at which the reaction between a permalloy film and a titanium film takes place.

DESCRIPTION OF THE PREFERRED EMBODIMENTS

EXAMPLE 1 AND COMPARATIVE EXAMPLE

Figure 1:
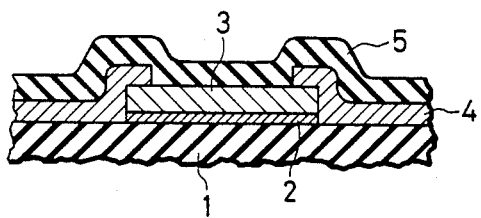
FIG. 1 is a cross-sectional view of a magnetoresistive magnetic head of the present invention prepared in Example 1 as described hereinafter.

FIG. 1 shows a cross-sectional view of a magnetoresistive magnetic head prepared in this example according to the present invention.

A 400 Å-thick permalloy film 2 having a composition comprising 19 wt % of iron with the balance being nickel was formed on a glass substrate 1 by the electron-beam evaporation method. A zirconium thin film 3 having a thickness of about 1500 Å was successively formed on the permalloy film without interruption of the evacuation of the system (the obtained two-layer film will be hereinafter referred to as "Zr/permalloy film"). Further, an aluminum electrode 4 was formed thereon by vacuum deposition before a 0.15 μm-thick $SiO_2$ film 5 was formed as a protective film over the whole surface thereof by sputtering, to thereby obtain a magnetoresistive magnetic head. During sputtering, the temperature of the Zr/permalloy film and aluminum electrode were set at 150° C. An increase in the temperature of the substrate serves to improve the adhesion of the $SiO_2$ film. The same results can be attained when an $Al_2O_3$ film is used instead of the $SiO_2$ film.

For comparison, a comparison sample was prepared as follows. A permalloy film having the same composition and dimensions as that formed above was formed on the same kind of a glass substrate as that used above. A titanium film having the same dimensions as the above zirconium film was formed on the permalloy film in the same manner as in the formation of the above Zr/permalloy film (the obtained two-layer film will be hereinafter referred to as "Ti/permalloy film"). Further, an aluminum electrode and $SiO_2$ film were formed thereon in the same manner as mentioned above to obtain a comparative sample.

Figure 2:
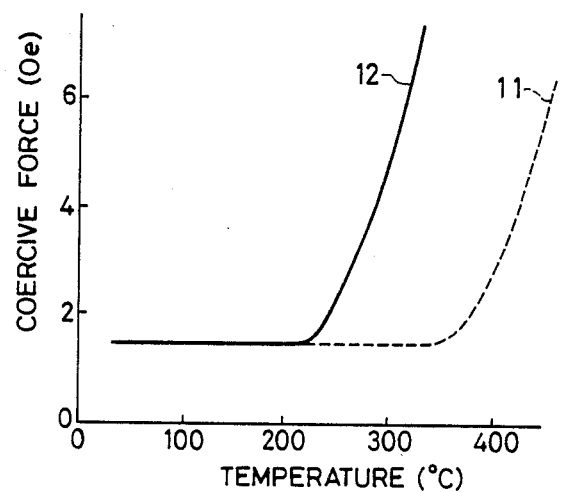
FIG. 2 is a graph illustrating the relationship between the heat treatment temperature and the coercive force of the permalloy film of the magnetoresistive magnetic head of the present invention prepared in Example 1, shown in comparison with that of a comparative one prepared in the Comparative Example as described hereinafter.

In order to compare the above-prepared samples with each other under the same conditions, the samples were put side by side in a vacuum furnace and heat treated therein under $10^{-7}$ Torr. FIG. 2 is a graph illustrating changes in coercive force of the permalloy film with heat treatment temperature. In the heat treatment, the heating time was 2 hours. In FIG. 2, the curve 11 shows the results of the cases where a zirconium film was used as a shunt film while the curve 12 shows the results of the cases where a titanium film was used as a shunt film (Comparative Example). As is apparent from FIG. 2, the coercive force of the permalloy film in the case of the Ti/permalloy two-layer film begins to increase as the heat treatment temperature reaches 225° C. or higher. This shows that the magnetic characteristics of the permalloy film deteriorate due to interdiffusion between the titanium and the permalloy film. In contrast, the coercive force of the permalloy film in the case of the Zr/permalloy two-layer film does not vary up to 300° C. and slightly increases when the heat treatment temperature reaches 325° C. or higher due to the deterioration of the permalloy film accompanying the reaction of the permalloy film with the zirconium film.

As is apparent from the foregoing, zirconium reacts with a permalloy film at a temperature higher by about 100° C. than that of titanium and significantly contributes to an improvement in the heat resistance of the permalloy in a two-layer film comprising a permalloy film and a metal film.

Meanwhile, the corrosion resistance of a zirconium film on which no $SiO_2$ film 5 was formed was examined and found to be comparable or superior to that of a titanium film.

The magnetic reproducing characteristics of the above shunt magnetoresistive heads prepared respectively using a Ti/permalloy two-layer film and a Zr/permalloy two-layer film were compared with each other. After heat treatment of the prepared heads at 225° C., the reproduced waveforms were determined. The waveforms of the head prepared using the Ti/permalloy film showed a remarkable Barhausen noise while the head prepared using the Zr/permalloy film showed no such noises. The head prepared using the Ti/permalloy film which had been heat-treated at a temperature of 275° C. or higher provided no reproduced waveforms while the head prepared using the Zr/permalloy film provided normal reproduced waveforms until the heat treatment temperature reached 325° C.

EXAMPLE 2

Figure 3:
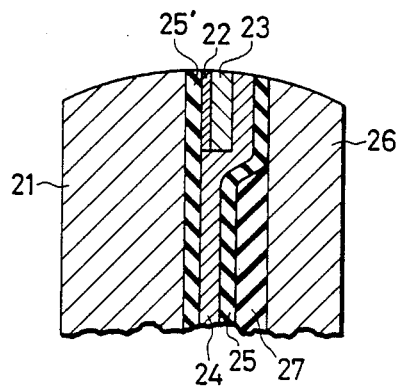
FIG. 3 is a cross-sectional view of a magnetoresistive magnetic head of the present invention prepared in Example 2 as described hereinafter.

FIG. 3 shows a cross-sectional view of a magnetic head prepared in this Example.

On a substrate 21 made of a Ni-Zn ferrite was formed a 0.6 μm-thick $SiO_2$ film 25' by sputtering. A Ni-Fe alloy (permalloy) thin film 22 having a composition comprising 19 wt % of iron with the balance being nickel, a zirconium thin film 23, an aluminum electrode 24 and a 0.15 μm-thick $SiO_2$ film 25 were formed in sequence on the $SiO_2$ film 25', and a Ni-Zn ferrite block 26 was attached thereon with an adhesive 27 composed of thermosetting resin such as epoxy resin.

The obtained magnetoresistive magnetic head of the present example exhibited not only excellent characteristics as in the magnetoresistive magnetic heads prepared in Example 1, but also a reproducing sensitivity considerably better than the magnetoresistive magnetic head prepared in Example 1.

In Example 1 and 2, well known photolithography was used in shaping the permalloy film, zirconium film, electrode, etc.

As is apparent from the foregoing, according to the present invention, since the maximum allowable temperature of a shunt biasing magnetoresistive element using a permalloy can be improved by about 100° C.

over that of the conventional Ti/permalloy system, the process for producing a magnetic head using the above-mentioned material can be conducted at a temperature by 100° C. higher than the conventionally adopted temperature. Therefore, since in preparing the magnetoresistive magnetic head of the present invention, the temperature to be used in the process can be increased by 100 C. as compared with the conventionally adopted temperature, the temperature of the substrate when forming various thin films thereon can be increased as compared with the conventionally adopted temperature. This leads to a remarkable improvement in, e.g., adhesion between films constituting the head including adhesion between the permalloy film and the base and adhesion between the Zr/permalloy film and the insulating film made of an oxide formed thereon, which, in turn, contributes to a remarkable improvement in yield of the element and decrease in percent defective. Further, the magnetoresistive magnetic head of the present invention is suitable also for readout of a high-density magnetic recording.

What is claimed is:

1. A magnetoresistive magnetic head comprising a two-layer film structure consisting of i) a magnetoresistive film comprised of a Ni-Fe alloy film containing 7 to 27 wt % of iron and substantially the balance of nickel and ii) a shunt film comprised of a zirconium film.

2. A magnetoresistive magnetic head according to claim 1, wherein said zirconium film has a thickness of 125 to 5000 Å.

3. A magnetoresistive magnetic head according to claim 2, wherein said magnetoresistive film has a thickness of 50 to 1,000 Å.

4. A magnetoresistive magnetic head according to claim 1, wherein said zirconium film has a thickness of 750 to 2500 Å.

5. A magnetoresistive magnetic head according to claim 1, wherein said zirconium film has a thickness 2.5 to 5 times that of said Ni-Fe alloy film.

6. A magnetoresistive magnetic head according to claim 1, wherein said magnetoresistive film has a thickness of 300 to 500 Å.

7. A magnetoresistive magnetic head according to claim 1, further comprising a substrate on which said two-layer film structure is provided.

8. A magnetoresistive magnetic head according to claim 7, wherein said substrate is made of a soft magnetic material.

9. A magnetoresistive magnetic head according to claim 8, wherein said soft magnetic material is Ni-Zn ferrite and an insulating film is provided between said substrate and said two-layer film.

10. A magnetoresistive magnetic head according to claim 7, wherein a block of soft magnetic material is provided on a side of said two-layer film structure opposite a side on which said substrate is provided.

* * * * *